US009846271B2

(12) United States Patent
Geng et al.

(10) Patent No.: US 9,846,271 B2
(45) Date of Patent: Dec. 19, 2017

(54) DISPLAY DEVICE HAVING A PATTERNED GLASS LIGHT GUIDE AND CTE-MATCHED TFT

(71) Applicant: CORNING INCORPORATED, Corning, NY (US)

(72) Inventors: Ying Geng, Redmond, WA (US); Jacques Gollier, Painted Post, NY (US); Steven S Rosenblum, Ithaca, NY (US)

(73) Assignee: Corning Incorporated, Corning, NY (US)

( * ) Notice: Subject to any disclaimer, the term of this patent is extended or adjusted under 35 U.S.C. 154(b) by 325 days.

(21) Appl. No.: 14/733,473

(22) Filed: Jun. 8, 2015

(65) Prior Publication Data

US 2015/0355401 A1 Dec. 10, 2015

Related U.S. Application Data

(60) Provisional application No. 62/010,093, filed on Jun. 10, 2014.

(51) Int. Cl.
*G02F 1/13357* (2006.01)
*G02B 6/10* (2006.01)
(Continued)

(52) U.S. Cl.
CPC ............ *G02B 6/0043* (2013.01); *G02B 5/00* (2013.01); *G02B 6/0016* (2013.01);
(Continued)

(58) Field of Classification Search
CPC .. G02B 6/0002; G02B 6/0011; G02B 6/0035; G02B 6/0043; G02F 1/133615; G02F 1/133617; F21V 2200/20; F21V 2200/30
See application file for complete search history.

(56) References Cited

U.S. PATENT DOCUMENTS 5,019,808 A * 5/1991 Prince ............... G02F 1/133617
345/102
5,211,463 A * 5/1993 Kalmanash .......... G02B 6/0051
349/104
(Continued)

FOREIGN PATENT DOCUMENTS

CN 101117270 A 2/2008
CN 102027398 A 4/2011
(Continued)

OTHER PUBLICATIONS

Bolshukhin,Vladimir, LED backlight with remote bi-layered photoluminescent converter for high brightness AMLCD, SID Conference Record of the International Display Research Conference 31st International Display Research Conference 2011, EuroDisplay 2011; Arcachon; France; Sep. 19, 2011 through Sep. 22, 2011; Code 89592.
(Continued)

*Primary Examiner* — Ismael Negron
(74) *Attorney, Agent, or Firm* — Ryan T. Hardee

(57) ABSTRACT

A display devices includes a patterned glass light guide and a thin film transistor having a coefficient of thermal expansion substantially similar to that of the glass light guide. A first surface of the glass light guide is patterned with a plurality of color converting elements and a second surface is optionally patterned with a plurality of light extraction features and/or color converting elements.

25 Claims, 3 Drawing Sheets

(51) Int. Cl.
*F21V 8/00* (2006.01)
*G02B 5/00* (2006.01)

(52) U.S. Cl.
CPC ......... *G02B 6/0036* (2013.01); *G02B 6/0053* (2013.01); *G02B 6/0055* (2013.01)

(56) References Cited

U.S. PATENT DOCUMENTS

| | | | | |
|---|---|---|---|---|
| 5,396,406 | A * | 3/1995 | Ketchpel | G02B 6/0003 349/62 |
| 6,295,106 | B1 * | 9/2001 | Fukuzawa | G02F 1/133603 349/159 |
| 6,791,636 | B2 * | 9/2004 | Paolini | G02B 6/0038 349/112 |
| 7,417,782 | B2 * | 8/2008 | Hagood | G02B 6/0043 359/230 |
| 8,209,841 | B2 | 7/2012 | Kanade et al. | |
| 8,233,117 | B2 * | 7/2012 | Nagata | G02B 6/0028 349/105 |
| 8,652,651 | B2 | 2/2014 | Sohn et al. | |
| 9,599,856 | B2 * | 3/2017 | Lee | G02F 1/133617 |
| 9,612,476 | B2 * | 4/2017 | Qiu | G02B 6/005 |
| 2003/0214616 | A1 | 11/2003 | Komoto et al. | |
| 2004/0189588 | A1 * | 9/2004 | Dong | G02B 6/0043 345/102 |
| 2006/0262569 | A1 * | 11/2006 | Kim | G02F 1/133615 362/626 |
| 2008/0074583 | A1 * | 3/2008 | Li | G02F 1/133617 349/71 |
| 2010/0170075 | A1 | 7/2010 | Kanade et al. | |
| 2010/0283075 | A1 | 11/2010 | McKenzie et al. | |
| 2011/0128471 | A1 | 6/2011 | Suckling et al. | |
| 2011/0182055 | A1 | 7/2011 | Kanade et al. | |
| 2012/0234486 | A1 | 9/2012 | Kanade et al. | |
| 2014/0009723 | A1 | 1/2014 | Cho et al. | |
| 2014/0056024 | A1 | 2/2014 | Kim et al. | |
| 2014/0078777 | A1 | 3/2014 | Kim et al. | |
| 2016/0070047 | A1 * | 3/2016 | Okuyama | G02B 6/005 349/71 |

FOREIGN PATENT DOCUMENTS

| | | |
|---|---|---|
| KR | 2010127284 A | 12/2010 |
| WO | 2009116014 A1 | 9/2009 |
| WO | 2013027170 A2 | 2/2013 |
| WO | 2013027170 A3 | 2/2013 |
| WO | 2014058748 | 4/2014 |

OTHER PUBLICATIONS

Yata, Tatsuya, et al. Emissive Liquid-Crystal Display Panels Consisting of Red-Green-Blue Patterned Phosphor Layers and Near-Ultraviolet Light-Emitting-Diode Backlight, Japanese Journal of Applied Physics, vol. 51 Issue 2 Part 1. Published Jan. 2012 (Abstract).

* cited by examiner

DISPLAY DEVICE HAVING A PATTERNED GLASS LIGHT GUIDE AND CTE-MATCHED TFT

This application claims the benefit of priority to U.S. Application No. 62/010,093 filed on Jun. 10, 2014 the content of which is incorporated herein by reference in its entirety.

FIELD OF THE DISCLOSURE

The disclosure relates generally to glass light guides and display devices comprising such light guides, and more particularly to patterned glass light guides and display devices comprising the same.

BACKGROUND

Liquid crystal displays (LCDs) are commonly used in various electronics, such as cell phones, laptops, electronic tablets, televisions, and computer monitors. However, LCDs can be limited as compared to other display devices in terms of brightness, contrast ratio, efficiency, and viewing angle. For instance, to compete with organic light emitting diode (OLED) technology, there is a demand for higher contrast ratio, color gamut, and brightness in conventional LCDs while also balancing power requirements, e.g., in the case of handheld devices. Further, an emerging trend in electronics includes transparent displays which allow the user to the see device components or other objects behind the display panel. However, existing backlight technology may, at best, provide a distorted view of the objects behind the panel or may partially or completely block view of these objects. Finally, overall consumer demand for thinner LCD devices drives the need for thinner backlight stacks.

Conventional LCD backlights may include a light guide comprising polymethyl methacrylate (PMMA). However, attempts to make thinner backlight stacks using thinner sheets of PMMA may have drawbacks of high price and/or low strength (flimsiness). Moreover, the thickness of conventional LCD backlights may also be affected by the presence of various polymer films, which serve to transport the light from the backlight to the backplane of the liquid crystal. For instance, the light may be injected into a transparent, e.g., PMMA, light guide with light extraction features that emit the light at large angles (e.g., greater than about 70 degrees). Light emitted toward the display may hit brightness enhancing films that alter its direction so that more light is emitted normal to the screen. Light emitted towards the LCD panel with polarization perpendicular to the polarizer in the LCD backplane may then hit a film that selectively reflects that polarization back through the backlight stack to reflect off of a Lambertian scattering layer of the reflector with a randomized polarization. The Lambertian scattering layer behind the light guide may reflect the recirculated light and the light emitted away from the LCD by the light guide back towards the LCD panel. The thickness of the backlight stack increases with the addition of each layer and may inhibit the ability to create thinner LCD devices. Moreover, the presence of additional layers may decrease the brightness of the device display, as each layer may transmit only a portion of the light incident on it.

Patterned backlights have been explored as a potential remedy to one or more of the drawbacks above but to Applicants' knowledge are not presently commercialized. For instance, U.S. Pat. No. 6,791,636, incorporated herein by reference in its entirety, is directed to patterned light guides. However, the alignment tolerance required between the three-dimensional light extraction features on a patterned light guide and the LCD thin-film transistor (TFT) is very tight, thus limiting the use of such patterned light guides in commercial applications.

Accordingly, it would be advantageous to provide backlights for LCD devices which address one or more of the above drawbacks, e.g., thinner backlights with lower cost and/or higher strength, backlights that require fewer layers for transporting light, and/or backlights with improved alignment stability between the light guide and the TFT. In various embodiments, LCD devices comprising such backlights may be brighter, may have a higher contrast ratio, may have improved viewing angles, and/or may be more energy efficient.

SUMMARY

The disclosure relates, in various embodiments, to display devices comprising a thin-film transistor (TFT) and at least one glass light guide, the light guide having a first surface, an opposing second surface, and at least one edge, wherein the first surface is patterned with a plurality of color converting elements, wherein the second surface is optionally patterned with a plurality of light extraction features and/or color converting elements, and wherein the coefficient of thermal expansion (CTE) of the light guide is substantially similar to the CTE of the TFT.

In certain embodiments, when a light source is optically coupled to the at least one edge of the light guide it produced a substantially uniform light output in term of at least one of spatial, spectral, and/or angular uniformity. According to various embodiments, the color converting elements may be chosen from quantum dots, fluorescent dyes, and/or red, green, and/or blue phosphors. The light extraction features may be produced, e.g., by texturizing or etching a surface of the light guide. For instance, the light guide surface may have a roughness $R_a$ ranging from about 10 nm to about 150 nm, such as about 50 nm. In other embodiments, the light extraction features may be coated with an organic or inorganic material having a refractive index substantially similar to that of the glass light guide. The display device may comprise additional components, such as a light source, a liquid crystal layer, a linear polarizer filter, a reflecting polarizer, and combinations thereof.

The disclosure also relates to glass light guides comprising a first surface, an opposing second surface, and at least one edge, wherein the first surface is patterned with a first plurality of color converters configured to emit white light, and wherein the second surface is optionally patterned with a plurality of light extraction features and/or a second plurality of color converters configured to emit white light. The first plurality and the second plurality of color converters, which may be identical or different, may be chosen from quantum dots, fluorescent dyes, red, green, and blue phosphors, and combinations thereof.

According to various embodiments, the glass light guide may be incorporated in a display device comprising at least one light source that may emit, e.g., blue light. When the light source is optically coupled to the edge(s) of the glass light guide, a white light with, e.g., a Lambertian angular distribution, may be produced. The display device may further comprise, in additional embodiments, at least one component chosen from linear polarizer, a reflective polarizer, a polymer microlens array, a liquid crystal layer, and combinations thereof. According to certain embodiments, the display device may comprise a thin-film transistor having a CTE substantially similar to the CTE of the glass light guide.

The disclosure further relates to light guides comprising a first surface, an opposing second surface, and at least one edge, wherein the first surface is patterned with a plurality of phosphors chosen from red, green, and/or blue phosphors, and wherein the second surface is optionally patterned with a plurality of light extraction features. In some embodiments, the glass light guide may be incorporated into a display device which may optionally further comprise a polymer microlens array. In other embodiments, the density of the phosphors and/or light extraction features on the light guide surfaces may be controlled such that the emission brightness of each color may be constant across the surface. According to further embodiments, the glass light guide may be incorporated into a display device such that the phosphors are aligned with the correlating sub-pixels of the display, which may transmit a single color. In such embodiments, it may be possible to produce a display device not comprising a color filter layer.

Still further disclosed herein are display devices comprising a thin-film transistor and a glass light guide comprising a first surface, an opposing second surface, and at least one edge, wherein the first surface is patterned with a plurality of color converters, and wherein the glass light guide has a coefficient of thermal expansion substantially equal to a coefficient of thermal expansion of the thin-film transistor Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be further understood when read in conjunction with the following drawings.

DETAILED DESCRIPTION

Figure 1:
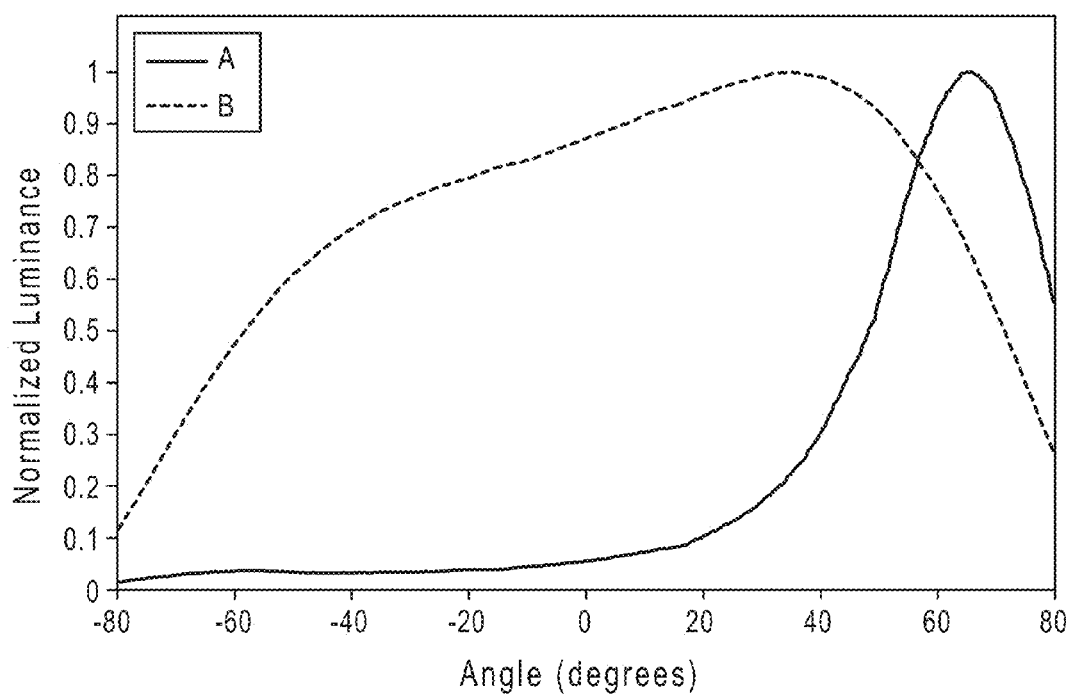
FIG. 1 is a plot of normalized luminance as a function of angle for a prior art light guide and a light guide according to one aspect of the present disclosure

Disclosed herein are display devices comprising a thin-film transistor (TFT) and at least one glass light guide, the light guide having a first surface, an opposing second surface, and at least one edge, wherein the first surface is patterned with a plurality of color converting elements, wherein the second surface is optionally patterned with a plurality of light extraction features and/or color converting elements, and wherein the coefficient of thermal expansion (CTE) of the light guide can be substantially similar to the CTE of the TFT.

Also disclosed herein are glass light guides comprising a first surface, an opposing second surface, and at least one edge, wherein the first surface is patterned with a plurality of color converters capable of emitting white light, and wherein the second surface is optionally patterned with a plurality of light extraction features and/or phosphors capable of emitting white light. Further disclosed herein are transparent light guides comprising a first surface, an opposing second surface, and at least one edge, wherein the first surface is patterned with a plurality of color converters chosen from red, green, and/or blue color converters, and wherein the second surface is optionally patterned with a plurality of light extraction features. In some embodiments, these glass light guides may be incorporated into display devices comprising, e.g., a TFT, at least one light source, a liquid crystal layer, at least one polarizing filter, a reflecting polarizer, and/or a polymer microlens array. In other embodiments, the light guides may be semi-transparent or substantially transparent. According to further embodiments, the light guide may have a CTE substantially similar to that of the TFT.

As used herein, the term "transparent" is intended to denote that the glass light guide, at a thickness of approximately 1 mm, has a transmission of greater than about 85% in the visible region of the spectrum (400-700 nm). For instance, an exemplary transparent glass light guide may have greater than about 85% transmittance in the visible light range, such as greater than about 90%, greater than about 95%, or greater than about 99% transmittance, including all ranges and subranges therebetween. According to various embodiments, the glass light guides may have a transmittance of less than about 50% in the visible region, such as less than about 45%, less than about 40%, less than about 35%, less than about 30%, less than about 25%, or less than about 20%, including all ranges and subranges therebetween. In certain embodiments, an exemplary glass light guide may have a transmittance of greater than about 50% in the ultraviolet (UV) region (100-400 nm), such as greater than about 55%, greater than about 60%, greater than about 65%, greater than about 70%, greater than about 75%, greater than about 80%, greater than about 85%, greater than about 90%, greater than about 95%, or greater than about 99% transmittance, including all ranges and subranges therebetween.

The glass light guide may comprise any glass known in the art for use as a light guide including, but not limited to, aluminosilicate, alkali-aluminosilicate, borosilicate, alkali-borosilicate, aluminoborosilicate, alkali-aluminoborosilicate, and other suitable glasses. In certain embodiments, the glass light guide may have a thickness of less than or equal to about 3 mm, for example, ranging from about 0.3 mm to about 2 mm, from about 0.7 mm to about 1.5 mm, or from about 1.5 mm to about 2.5 mm, including all ranges and subranges therebetween. Non-limiting examples of commercially available glasses suitable for use as a glass light guide include, for instance, EAGLE XG®, Lotus™, Willow®, and Gorilla® glasses from Corning Incorporated.

The glass light guide may comprise a first surface and an opposing second surface. The surfaces may, in certain embodiments, be planar or substantially planar, e.g., substantially flat and/or level. The first and second surfaces may, in various embodiments, be parallel or substantially parallel. The glass light guide may further comprise at least one edge, for instance, at least two edges, at least three edges, or at least four edges. By way of a non-limiting example, the light guide may comprise a rectangular or square glass sheet having four edges, although other shapes and configurations are envisioned and are intended to fall within the scope of the disclosure.

According to various embodiments, the first surface and optionally the second surface of the light guide may be patterned with a plurality of color converting elements. The second surface of the light guide may, in some embodiments, be patterned with a plurality of light extraction features. As used herein, the term "patterned" is intended to denote that the plurality of elements and/or features are present on the surface of the light guide in any given pattern or design, which may, for example, be random or arranged, repetitive or non-repetitive. For instance, in the case of color converting elements, such elements may be coated onto the first and/or second surface according to various non-limiting embodiments. In the case of light extraction features, such features may be distributed across the second surface, e.g. as textural features making up a roughened surface.

As used herein the term "color converting element" and variations thereof can denote, for example, elements capable of receiving light and converting the light into a different, e.g., longer wavelength. For instance, the color converting elements or "color converters" may be chosen from quantum dots, fluorescent dyes, e.g., coumarin and rhodamine, to name a few, and/or phosphors, e.g., red, green, and/or blue phosphors. According to various embodiments, the color converting elements may be chosen from green and red phosphors. For example, when irradiated with blue, UV, or near-UV light, a phosphor may convert the light into longer red, yellow, green, or blue wavelengths. Further, exemplary color converting elements may comprise quantum dots emitting in the red and green when irradiated with blue, UV, or near-UV light.

Figure 5:
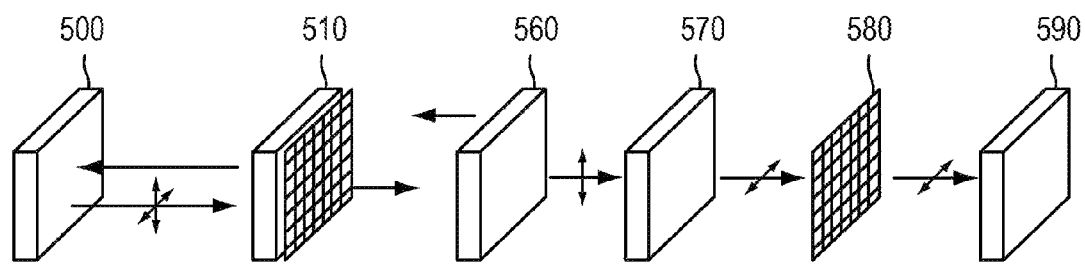
FIG. 5 is a simplified depiction of a display configuration according to other aspects of the present disclosure.

The use of color converters on the surface(s) of the light guide may, in some embodiments, serve to randomize the emission angle of the light as compared to conventional light guides. FIG. 5 is a plot illustrating normalized luminance as a function of angle for a conventional light guide (Plot A) and a light guide comprising a plurality of phosphors (edge-lit with blue light) (Plot B). As shown in Plot A, conventional light guides (using greater than about 5 µm scattering features) produce a majority of emissions at higher angles (e.g., greater than about 70 degrees). Without wishing to be bound by theory, it is believed that this is due to the index difference between the light guide and air and the requirement that the diffraction conserve momentum. However, as shown in Plot B, in the color-conversion process using, e.g., phosphors, a much more uniform angular emission than conventional light guide can be obtained. Without wishing to be bound by theory, it is believed that the light emitted from such color converting elements does not necessarily have the same momentum as the incident light since the internal degrees of freedom in the color converting element (e.g., elastic scattering between electronic states) effectively decorrelate the incident and scattered photons' momenta. Further, while there is more forward scattering than backward scattering in the case of the phosphor light guide, the difference is less than about 30%, as compared to 90% for conventional light guides.

In various embodiments, the light extraction features optionally present on the second surface of the light guide may comprise light scattering sites. For example, the second surface of the light guide may be textured, etched, coated, damaged and/or roughened to produce the light extraction features. Non-limiting examples of such methods include, for instance, acid etching the surface, coating the surface with $TiO_2$, and laser damaging the glass surface. According to various embodiments, the extraction features may be patterned in a suitable density so as to produce a substantially uniform illumination. The light extraction features may produce surface scattering and/or volumetric scattering of light, depending on the depth of the features in the glass surface. The optical characteristics of these features can be controlled, e.g., by the processing parameters used when producing the extraction features.

Moreover, the sizes of the light extraction features may also affect the light scattering properties of the light guide. Without wishing to be bound by theory, it is believed that small features may scatter light backwards as well as forwards, whereas larger features tend to scatter light predominantly forward. Thus, for example, according to various embodiments, the light extraction features may have a correlation length less than about 100 nm, such as 70 nm, or less than about 50 nm. Furthermore, larger extraction features may, in some embodiments, provide a forward light scatter but at a small angular spread. Accordingly, in various embodiments, the light extraction features may range in correlation length from about 20 nm to about 500 nm, such as from about 50 nm to about 100 nm, from about 150 nm to about 200 nm, or from about 250 to about 350 nm, including all ranges and subranges therebetween as well as combinations of ranges to form hierarchical features.

In certain embodiments, the second surface of the glass light guide may have a texture, produced either by etching, damaging, coating, and/or roughening such that the surface has an average roughness $R_a$ ranging from about 10 nm to about 150 nm, such as less than about 100 nm, less than about 80 nm, less than about 60 nm, less than about 50 nm, or less than about 25 nm, including all ranges and subranges therebetween. For example, the second surface of the glass light guide may have a surface roughness $R_a$ of about 50 nm or, in other embodiments, about 100 nm, or about 20 nm. According to various embodiments, the second surface may be substantially planar, e.g., substantially flat and/or level, even when textured, to produce a plurality of light extraction features.

The glass light guide may be treated to create light extraction features according to any method known in the art, e.g., the methods disclosed in co-pending and co-owned International Patent Application No. PCT/US2013/063622, incorporated herein by reference in its entirety. For example, a glass sheet may be ground and/or polished to achieve the desired thickness and/or surface quality. The glass may then be optionally cleaned and/or the surface of the glass to be etched may be subjected to a process for removing contamination, such as exposing the surface to ozone.

The glass may also be chemically strengthened, e.g., by ion exchange. During the ion exchange process, ions within a glass sheet at or near the surface of the glass sheet may be exchanged for larger metal ions, for example, from a salt bath. The incorporation of the larger ions into the glass can strengthen the sheet by creating a compressive stress in a near surface region. A corresponding tensile stress can be induced within a central region of the glass sheet to balance the compressive stress.

Ion exchange may be carried out, for example, by immersing the glass in a molten salt bath for a predetermined period of time. Exemplary salt baths include, but are not limited to, $KNO_3$, $LiNO_3$, $NaNO_3$, $RbNO_3$, and combinations thereof. The temperature of the molten salt bath and treatment time period can vary. It is within the ability of one skilled in the art to determine the time and temperature according to the desired application. By way of a non-limiting example, the temperature of the molten salt bath may range from about 400° C. to about 800° C., such as from about 400° C. to about 500° C., and the predetermined time period may range from about 4 to about 24 hours, such as from about 4 hours to about 10 hours, although other temperature and time combinations are envisioned. By way of a non-limiting example, the glass can be submerged in a $KNO_3$ bath, for example, at about 450° C. for about 6 hours to obtain a K-enriched layer which imparts a surface compressive stress.

The surface to be etched may, by way of a non-limiting embodiment, be exposed to an acid bath, e.g., a mixture of glacial acetic acid (GAA) and ammonium fluoride ($NH_4F$) in a ratio, e.g., ranging from about 1:1 to about 9:1. The etching time may range, for example, from about 30 seconds to about 15 minutes, and the etching may take place at room temperature or at elevated temperature. Process parameters such as acid concentration/ratio, temperature, and/or time may affect the size, shape, and distribution of the resulting extraction features. It is within the ability of one skilled in the art to vary these parameters to achieve the desired surface extraction features.

The optical light scattering characteristics of the light guide may also be affected by the refractive index of the glass. According to various embodiments, the glass light guide may have a refractive index ranging from about 1.3 to about 1.7, such as from about 1.4 to about 1.6, including all ranges and subranges therebetween. Optionally, the second surface comprising a plurality of light extraction features may be coated with an organic or inorganic material having substantially the same index of refraction as the glass. For example, the surface may be coated with a resin, such as Accuglass T-11 from Honeywell Corp. According to various embodiments, the refractive index of the coating material is substantially similar to the refractive index of the glass light guide. In certain embodiments, the coating may include an appropriate thickness to reduce the roughness of respective light extraction features of the embodiment. For example, in some embodiments the coating (formed by any suitable means of deposition) can conform to the roughness of a respective surface such that the thickness of the coating has an RMS thickness substantially equal to the RMS roughness of that surface.

The glass light guide according to the present disclosure may be employed in a display device, e.g., an LCD device comprising a thin-film transistor (TFT). In various embodiments, the glass light guide may have a coefficient of thermal expansion (CTE) substantially similar to that of the TFT. For instance, the glass light guide may have a CTE up to about $100\times10^{-7}$/K, e.g., ranging from about 20 to about $100\times10^{-7}$/K, such as from about 55 to about $95\times10^{-7}$/K, or from about 25 to about $50\times10^{-7}$/K, including all ranges and subranges therebetween. By using glass with a CTE substantially matched to the CTE of the TFT, it is believed that the mechanical rigidity and/or thermal and/or chemical properties of the guide will be improved as compared to traditionally used polymers (e.g., PMMA, which can have a CTE in the range of about 500 to about $1000\times10^{-7}$/K). According to certain embodiments, the glass light guide may have a CTE that is at least about 5 times closer to the CTE of the TFT as compared to prior art, e.g., PMMA, light guides.

As used herein, the term "substantially similar" is intended to denote that two values are approximately equal, e.g., within an order or two of magnitude in some cases, or within about 10% of each other, such as within about 5% of each other, or within about 2% of each other in some cases. For example, in the case of a refractive index of 1.5, a substantially similar refractive index may range from about 1.35 to about 1.65. In the case of a CTE of $30\times10^{-7}$/K, a substantially similar CTE may range from about 10 to about $100\times10^{-7}$/K, which is in contrast to, for instance, the CTE difference between polymers and glass, which may differ by two orders of magnitude.

The extraction features in the light guide may vary along its length such that the extraction efficiency per unit length, $$\epsilon(x) = \frac{\eta}{L - x\eta},$$

where $$\eta \equiv \frac{\text{Power}(x=0) - \text{Power}(x=L)}{\text{Power}(x=0)},$$

L is the length of the light guide, and x is the position along the light guide. The extraction efficiency per unit length may dictate the color converting element density across the surface of the light guide. If the chosen elements, e.g., phosphors, couple a fraction of light, β, out of the light guide and if the conversion efficiency is Λ, then a light guide using only color converting elements, e.g., phosphors, for light extraction would have a density across the surface given by $$\sigma_{phosphor}(x) = \frac{\beta\Lambda\eta}{L - x\eta}.$$

The density of the color converting elements and/or light extraction features on the light guide surfaces may thus be controlled so as to produce a substantially spatially, spectrally, and/or angularly uniform light emission, in which the emission brightness of each color may be constant across the surface.

The present disclosure additionally relates, in various embodiments, to glass light guides comprising a first surface, an opposing second surface, and at least one edge, wherein the first surface is patterned with a first plurality of color converters capable of emitting white light, and wherein the second surface is optionally patterned with a plurality of light extraction features and/or a second plurality of color converters capable of emitting white light. The first and second plurality of color converters, which may be identical or different, may be chosen from quantum dots, fluorescent dyes, red, green, and blue phosphors, and combinations thereof. The converters may, in certain embodiments, be phosphors capable of converting blue light into white light, e.g., in the case of a display device with a blue light source. When a light source is optically coupled to the edge(s) of the glass light guide, a white light with, e.g., a Lambertian angular distribution, may be produced. Such light guides may be useful to replace existing backlights for conventional LCDs or transparent LCDs or for general illumination.

The disclosure further relates to display devices comprising a thin-film transistor and a glass light guide comprising a first surface, an opposing second surface, and at least one edge, wherein the first surface is patterned with a plurality of color converters, and wherein the glass light guide has a coefficient of thermal expansion substantially equal to a coefficient of thermal expansion of the thin-film transistor Still further disclosed herein are glass light guides comprising a first surface, an opposing second surface, and at least one edge, wherein the first surface is patterned with a plurality of color converters chosen from red, green, and/or blue phosphors, and wherein the second surface is optionally patterned with a plurality of light extraction features. According to various embodiments, when a light source is optically coupled to the edge(s) of the glass light guide, a variety of colors may be produced, with an emission brightness for each color that is constant across the surface.

As used herein, the term "optically coupled" is intended to denote that a light source is positioned at an edge of the glass light guide so as to introduce light into the guide. When light is injected into the light guide, according to certain embodiments, the light is trapped and bounces within the light guide due to total internal reflection (TIR) until it hits a color converting element (e.g., phosphor or quantum dot) on the first or second surface or a light extraction feature on the second surface.

Light guides according to the present disclosure may provide one or more benefits discussed below, as compared to conventional light guides. In some embodiments, as compared to conventional PMMA light guides, the instant glass light guides may provide a cheaper and/or stronger alternative, e.g., a thinner material that can retain rigidity, for instance, having a Young's modulus about 15 to 30 times greater than that of PMMA. Furthermore, conventional PMMA light guides tend to emit light at larger angles (e.g., greater than about 70 degrees), which is unsuitable for transparent displays and requires multiple optical components in the backlight. By comparison, light guides comprising a textured surface according to various aspects of the instant disclosure may reduce the emission angle (e.g., as low as about 50 degrees). While the textured glass light guide alone may still require additional optical components to shift the emission angle to 0 degrees, the use of color converting elements on one or more surfaces may randomize the emission angle, thereby eliminating the need for one or more such optical components, such as the color filter. Further, PMMA can absorb water, which may require device bezels to accommodate expansion and contraction of the light guide. In contrast, the glass light guides disclosed herein may be stable over a broad range of temperature and humidity. Finally when cold cathode fluorescent lamps (CCFLs) are used as the light source, polymer light guides may suffer high adsorption of the UV light and may decompose over time, whereas the glass light guides disclosed herein may not suffer from such drawbacks. It is to be understood that the glass light guides according to the present disclosure may not exhibit one or more of the above improvements, but are still intended to fall within the scope of the disclosure.

The glass light guides disclosed herein may be used in various display devices including, but not limited to LCDs. Traditional backlight units used in LCDs can comprise various components. One or more light sources may be used, for example light-emitting diodes (LEDs) or cold cathode fluorescent lamps (CCFLs). Conventional LCDs may employ LEDs or CCFLs packaged with color converting phosphors to produce white light. According to various aspects of the disclosure, display devices employing the disclosed glass light guides may comprise at least one light source emitting blue light (UV light, approximately 100-400 nm), such as near-UV light (approximately 300-400 nm).

Figure 2:
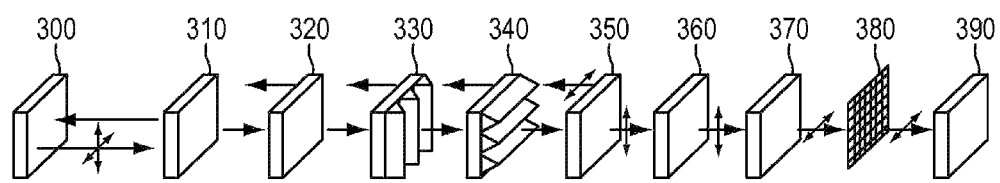
FIG. 2 illustrates optical components of an exemplary LCD stack.

Referring now to FIG. 2, the optical components of an exemplary LCD may further comprise a reflector 300 which sends recycled light back through the light guide. The reflector may reflect, e.g., up to about 85% of the light and may randomize its angular and polarization properties. The light may then pass through a light guide 310, which directs light toward the LCD. A diffuser 320 may be used to improve the spatial uniformity of the light. A first prism film 330 may reflect light at high angles back towards the reflector for recycling and may serve to concentrate light in the forward direction. A second prism film 340 may be positioned orthogonal to the first prism film and may function in the same manner but along the orthogonal axis.

A reflecting polarizer 350 may reflect light of one polarization back towards the reflector for recycling and may serve to concentrate light into a single polarization. A first linear polarizer 360 may be employed to permit passage of only light with a single polarization. A TFT array 370 may comprise active switching elements that permit voltage addressing of each sub-pixel of the display. A liquid crystal layer (not shown) may comprise an electrooptic material, the structure of which rotates upon application of an electric field, causing a polarization rotation of any light passing through it. A color filter 380 may comprise an array of red, green, and blue filters aligned with the sub-pixels that may produce the display color. Finally, a second linear polarizer 390 may be used to filter any non-rotated light.

Figure 3:
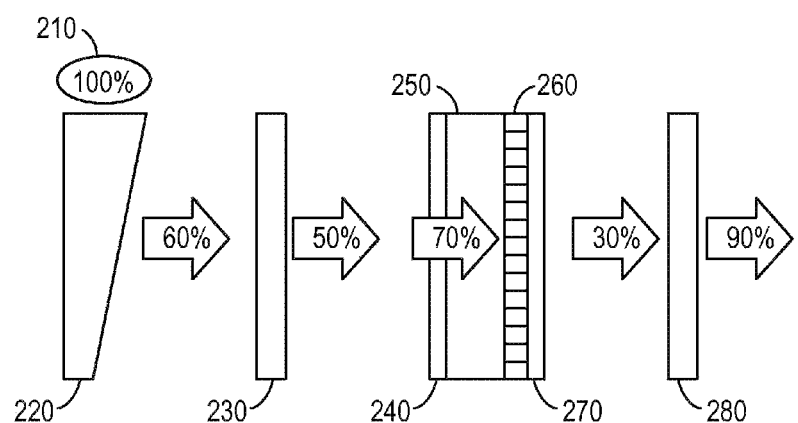
FIG. 3 is a depiction of optical losses in an exemplary prior art LCD.

Conventional LCDs, such as that illustrated in FIG. 2, may transmit only between about 4% and about 7% of the light from the backlight to the user. As illustrated in FIG. 3, a conventional LCD may utilize a light source 210, providing the maximum available light (100%). The light can then pass through a light guide plate 220, which may transmit, e.g., up to about 60% of the available light. A polarizer 230 may then further filter and transmit, e.g., up to about 50% of the light incident on it. The light can then pass through a TFT array 240 and a liquid crystal layer 250, which may transmit, e.g., up to about 70% of the incident light. The color filter 260 may, for example, transmit about one-third or 30% of the light incident on it. They light may pass through a conductive layer 270, e.g., indium tin oxide, and an additional polarizer 280, which may further filter and transmit, e.g., up to about 90% of the incident light. Thus, a conventional LCD according to FIG. 2 would have a light efficiency of only about 5% (0.6×0.5×0.7×0.3×0.9=0.05).

By incorporating a glass light guide according to the instant disclosure, one or more of the above conventional components may be omitted from the LCD stack. For example, in one embodiment, the color filter may be excluded, which may increase display brightness by approximately 3 times. However, removing the color filter may, in some embodiments, require tighter alignment between the backlight and the TFT due to the decreased distance between these components. Accordingly, in one aspect of the disclosure, the glass light guide may have a CTE substantially similar to that of the TFT, which may provide improved alignment stability between the two components.

Conventional LCDs using LED light sources may incur light loss at the phosphors on the LED, at the apertures on the LCD backplane, and/or on the color filter. According to additional aspects of the disclosure, a display device disclosed herein may be equipped with a polymer microlens array to center the light on each display sub-pixel, thus reducing or eliminating light hitting the pixel apertures. Accordingly, a display device employing a light guide patterned with a plurality of color converting elements (as opposed to an LED packaged with phosphors), not comprising a color filter, and/or comprising a polymer microlens array as disclosed herein may, in certain embodiments, improve display brightness by over 300%.

The table below compares the optical components in a conventional LCD and in a non-limiting exemplary embodiment of the instant disclosure.

| Conventional LCD | Exemplary LCD |
| --- | --- |
| Reflector | Reflector |
| White LEDs or CCFLs | Blue LEDs |
| Light guide | Patterned light guide |
| First prism film | Polymer microlens array |
| Second prism film | |
| Reflecting polarizer | Reflecting polarizer |
| Linear polarizer | Linear polarizer |
| TFT array | TFT array |
| Liquid crystal | Liquid crystal |
| Color filter | Glass cover |
| Linear polarizer | Linear polarizer |

According to the exemplary embodiment set forth above, light from a blue LED is optically coupled to an edge of a patterned light guide and may be extracted with uniform intensity across the surface. An optional reflecting polarizer may reflect light oriented perpendicular to the TFT linear polarizer back towards the light guide for recycling. Light passing through the optional reflecting polarizer may be coupled to an optional polymer microlens array which may focus it into the center of each sub-pixel such that it does not hit the black matrix on the back of the TFT. The light may then pass through the liquid crystal panel as in a conventional LCD, with the exception that there is no need for a color filter in some embodiments.

Figure 4:
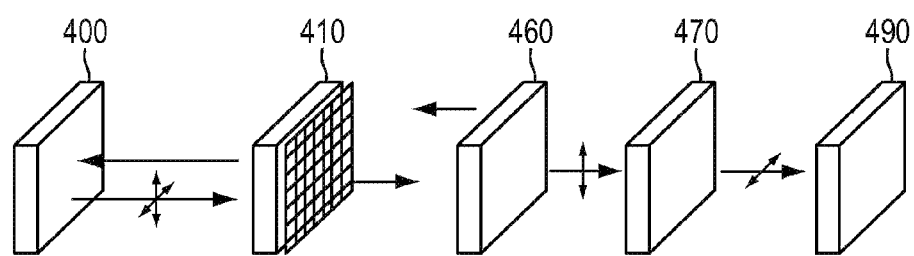
FIG. 4 is a simplified depiction of a display configuration according to certain aspects of the present disclosure.

For example, FIG. 4 illustrates one non-limiting embodiment of a display device according to the instant disclosure. The display device may comprise, e.g., a reflector 400, a light guide 410, a first linear polarizer 460, a TFT array 470, and a second linear polarizer 490. In another non-limiting embodiment, such as that illustrated in FIG. 5, the display device may comprise a color filter 580, e.g., in addition to the reflector 500, light guide 510, first linear polarizer 560, TFT array 570, and second linear polarizer 590.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a light source" includes examples having two or more such light sources unless the context clearly indicates otherwise. Likewise, a "plurality" is intended to denote "more than one." As such, a "plurality of color converting elements" includes two or more such elements, such as three or more such elements, etc.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, such as within about 5% of each other, or within about 2% of each other. In other embodiments, "substantially similar" can be compared to the range of values seen in the industry today. For instance, for CTEs of light guides and TFTs, light guides having CTEs between about 10 and about 100 are considered substantially similar to TFTs having CTEs of about 30, e.g., as compared to conventional light guides having CTEs on the order of 500.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a device that comprises A+B+C include embodiments where a device consists of A+B+C and embodiments where a device consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A display device comprising:
   (a) a thin-film transistor,
   (b) a glass light guide comprising a first surface, an opposing second surface, and at least one edge, and
   (c) a first linear polarizer positioned therebetween,
   wherein the first surface of the glass light guide is patterned with a first plurality of color converting elements,
   wherein the second surface of the glass light guide is patterned with at least one of a plurality of light extraction features or a second plurality of color converting elements,
   wherein the second surface of the glass light guide has an average roughness, $R_a$, ranging from about 10 nm to about 150 nm, and wherein the glass light guide has a coefficient of thermal expansion substantially equal to a coefficient of thermal expansion of the thin-film transistor.

2. The display device of claim 1, further comprising at least one light source, wherein the glass light guide produces a substantially uniform emission in terms of at least one of spectral, spatial, and angular uniformity when the at least one light source is optically coupled to the at least one edge.

3. The display device of claim 1, wherein the glass light guide comprises a glass chosen from aluminosilicate, alkali-aluminosilicate, borosilicate, alkali-borosilicate, alumino-borosilicate, and alkali-aluminoborosilicate glasses.

4. The display device of claim 1, wherein at least one of the first plurality and second plurality of color converting elements is chosen from quantum dots, fluorescent dyes, red, green, and blue phosphors, and combinations thereof.

5. The display device of claim 1, wherein the second surface of the glass light guide is patterned with a plurality of light extraction features, and wherein the plurality of light extraction features are textural features produced by etching, roughening, coating, or damaging the second surface.

6. The display device of claim 1, wherein the second surface is patterned with a plurality of light extraction features formed by acid etching, $TiO_2$ coating, or damage by laser.

7. The display device of claim 1, wherein the second surface has an average roughness, $R_a$, equal to about 50 nm.

8. The display device of claim 1, wherein the second surface is coated with an inorganic or organic material having a refractive index substantially similar to a refractive index of the glass light guide.

9. The display device of claim 1, further comprising at least one component chosen from a light source, a second linear polarizer, a reflective polarizer, a polymer microlens array, a liquid crystal layer, and combinations thereof.

10. The display device of claim 1, wherein the display device does not comprise a band-pass-type color filter.

11. A display device comprising a glass light guide, a thin-film transistor, and a first linear polarizer positioned therebetween, wherein:
the glass light guide comprises a first surface, an opposing second surface, and at least one edge, wherein the first surface is patterned with a first plurality of color converters configured to emit white light, and wherein the second surface is patterned with at least one of a plurality of light extraction features or a second plurality of color converters configured to emit white light, and
the display device does not comprise a band-pass-type color filter.

12. The display device of claim 11, further comprising at least one component chosen from a light source, a second linear polarizer, a reflective polarizer, a polymer microlens array, a liquid crystal layer, and combinations thereof.

13. The display device of claim 11, wherein the thin-film transistor has a coefficient of thermal expansion substantially similar to a coefficient of thermal expansion of the glass light guide.

14. The glass light guide of claim 11, wherein at least one of the first plurality and second plurality of color converters are chosen from quantum dots, fluorescent dyes, red, green, and blue phosphors, and combinations thereof.

15. The glass light guide of claim 14, wherein the second surface is patterned with a second plurality of color converters, and wherein the first plurality and second plurality of color converters are different.

16. A display device comprising a thin-film transistor, a glass light guide, and a first linear polarizer positioned therebetween, wherein:
the glass light guide comprises a first surface patterned with a plurality of color converting elements, an opposing second surface, and at least one edge,
the display device does not comprise a band-pass-type color filter, and
the glass light guide has a coefficient of thermal expansion substantially equal to a coefficient of thermal expansion of the thin-film transistor.

17. The display device of claim 16, further comprising at least one component chosen from a light source, a second linear polarizer, a reflective polarizer, a polymer microlens array, a liquid crystal layer, and combinations thereof.

18. The display device of claim 17, wherein the second surface is patterned with a plurality of light extraction features.

19. The display device of claim 17, wherein the plurality of color converting elements are chosen from quantum dots, fluorescent dyes, red, green, and blue phosphors, and combinations thereof.

20. A display device comprising:
(a) a thin-film transistor,
(b) a glass light guide comprising a first surface, an opposing second surface, and at least one edge, and
(c) a first linear polarizer positioned therebetween,
wherein the first surface of the glass light guide is patterned with a first plurality of color converting elements,
wherein the second surface of the glass light guide is patterned with at least one of a plurality of light extraction features or a second plurality of color converting elements,
wherein the second surface is coated with an inorganic or organic material having a refractive index substantially similar to a refractive index of the glass light guide, and
wherein the glass light guide has a coefficient of thermal expansion substantially equal to a coefficient of thermal expansion of the thin-film transistor.

21. A display device comprising:
(a) a thin-film transistor;
(b) a glass light guide comprising a first surface, an opposing second surface, and at least one edge, and
(c) a first linear polarizer positioned therebetween,
wherein the first surface of the glass light guide is patterned with a first plurality of color converting elements,
wherein the second surface of the glass light guide is patterned with at least one of a plurality of light extraction features or a second plurality of color converting elements,
wherein the display device does not comprise a band-pass-type color filter, and
wherein the glass light guide has a coefficient of thermal expansion substantially equal to a coefficient of thermal expansion of the thin-film transistor.

22. A display device comprising:
(a) a thin-film transistor;
(b) a glass light guide comprising a first surface, an opposing second surface, and at least one edge, and
(c) a first linear polarizer positioned therebetween,
wherein the first surface of the glass light guide is patterned with a first plurality of color converting elements, wherein the second surface of the glass light guide is patterned with a second plurality of color converting elements, wherein the first plurality and second plurality of color converting elements are different, and wherein the glass light guide has a coefficient of thermal expansion substantially equal to a coefficient of thermal expansion of the thin-film transistor.

23. A display device comprising a glass light guide, a thin-film transistor, and a first linear polarizer positioned therebetween, wherein:

the glass light guide comprises a first surface, an opposing second surface, and at least one edge, the first surface of the glass light guide is patterned with a first plurality of color converters configured to emit white light, the second surface of the glass light guide is patterned with at least one of a plurality of light extraction features or a second plurality of color converters configured to emit white light, and the second surface of the glass light guide has an average roughness, $R_a$, ranging from about 10 nm to about 150 nm.

24. A display device comprising a glass light guide, a thin-film transistor, and a first linear polarizer positioned therebetween, wherein:

the glass light guide comprises a first surface, an opposing second surface, and at least one edge, wherein the first surface is patterned with a first plurality of color converters configured to emit white light, and wherein the second surface is patterned with at least one of a plurality of light extraction features or a second plurality of color converters configured to emit white light, and the second surface is coated with an inorganic or organic material having a refractive index substantially similar to a refractive index of the glass light guide.

25. A display device comprising a glass light guide, a thin-film transistor, and a first linear polarizer positioned therebetween, wherein:

the glass light guide comprises a first surface, an opposing second surface, and at least one edge, the first surface of the glass light guide is patterned with a first plurality of color converters configured to emit white light, the second surface of the glass light guide is patterned with a second plurality of color converters configured to emit white light, and the first plurality and second plurality of color converting elements are different.

\* \* \* \* \*